(12) United States Patent
Ho et al.

(10) Patent No.: US 11,868,393 B2
(45) Date of Patent: Jan. 9, 2024

(54) METHODS AND SYSTEMS FOR DETERMINING COLOR LABELING FOR A VEHICLE SEARCH SERVICE

(71) Applicant: Capital One Services, LLC, McLean, VA (US)

(72) Inventors: Chi-San Ho, Allen, TX (US); Yue Duan, Plano, TX (US); Micah Price, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 504 days.

(21) Appl. No.: 17/126,531

(22) Filed: Dec. 18, 2020

(65) Prior Publication Data
US 2022/0197941 A1   Jun. 23, 2022

(51) Int. Cl.
| | |
|---|---|
| G06K 9/00 | (2022.01) |
| G06F 16/583 | (2019.01) |
| G06F 16/532 | (2019.01) |
| G06F 16/535 | (2019.01) |
| G06V 10/22 | (2022.01) |
| G06V 10/56 | (2022.01) |
| G06V 10/75 | (2022.01) |
| G06F 18/22 | (2023.01) |
| G06F 18/2321 | (2023.01) |

(52) U.S. Cl.
CPC ........ G06F 16/5838 (2019.01); G06F 16/532 (2019.01); G06F 16/535 (2019.01); G06F 18/22 (2023.01); G06F 18/2321 (2023.01); G06V 10/22 (2022.01); G06V 10/56 (2022.01); G06V 10/751 (2022.01); G06V 2201/08 (2022.01)

(58) Field of Classification Search
CPC .. G06F 16/5838; G06F 16/532; G06F 16/535; G06F 18/22; G06F 18/2321; G06V 10/22; G06V 10/56; G06V 10/751; G06V 2201/08; G06T 7/90; G06T 2219/004; G06T 2207/30248
See application file for complete search history.

(56) References Cited

U.S. PATENT DOCUMENTS

| | | | |
|---|---|---|---|
| 8,953,895 B2 | 2/2015 | Kawanishi et al. | |
| 2014/0324864 A1 | 10/2014 | Choe et al. | |
| 2016/0148072 A1* | 5/2016 | Chan | G06V 20/54 382/104 |
| 2016/0203367 A1* | 7/2016 | Oami | G06F 18/22 382/103 |

* cited by examiner

Primary Examiner — Duy M Dang
(74) Attorney, Agent, or Firm — Bookoff McAndrews, PLLC (57) ABSTRACT

Disclosed are methods, systems, and non-transitory computer-readable medium for determining color labeling for a vehicle search service. For instance, the method may include: obtaining vehicle images for a plurality of vehicles; filtering the vehicle images to obtain exterior and/or interior images of the plurality of vehicles, determining super-pixel values for the exterior images and/or the interior images; generating a standard color mapping by associating the super-pixel values to standard color names; and storing searchable vehicle information at least based on the standard color mapping.

20 Claims, 7 Drawing Sheets

METHODS AND SYSTEMS FOR DETERMINING COLOR LABELING FOR A VEHICLE SEARCH SERVICE

TECHNICAL FIELD

Various embodiments of the present disclosure relate generally to methods and systems for determining color labeling for a vehicle search service and, more particularly, to methods and systems for determining color labeling for a vehicle search service using super-pixel values.

BACKGROUND

Vehicle related information (e.g., vehicle inventory information) may be collected from various vehicle information providers (e.g., dealerships). Some vehicle information providers may provide vehicle related information that is inaccurate and/or includes mistakes such as misspellings. Conventional systems and methods for reviewing and storing such vehicle related information utilizes human review which results in unnecessary resources spent on inefficient manual labor. Accordingly, there is a need for an improved method of collecting and determining vehicle color labeling.

The present disclosure is directed to overcoming one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, systems and methods are disclosed for determining color labeling for a vehicle search service.

For instance, a method for determining color labeling for a vehicle search service may include generating a standard color mapping for vehicles by: obtaining vehicle information; extracting vehicle images for a plurality of vehicles from the vehicle information; filtering the vehicle images to obtain exterior images and/or interior images of the plurality of vehicles; determining super-pixel values for the exterior images and/or the interior images; and generating the standard color mapping by associating the super-pixel values to standard color names; and storing searchable vehicle information by: processing the plurality of vehicles using the standard color mapping to determine particular standard color names for the plurality of vehicles; and associating the particular standard color names with the respective plurality of vehicles as a part of the searchable vehicle information, the searchable vehicle information enabling generation of search results based on the particular standard color names for the plurality of vehicles.

A system may include a memory storing instructions; and a processor executing the instructions to perform a process. The process may include generating a standard color mapping for vehicles by: obtaining vehicle information; extracting vehicle images for a plurality of vehicles from the vehicle information; filtering the vehicle images to obtain exterior images and/or interior images of the plurality of vehicles; determining super-pixel values for the exterior images and/or the interior images; and generating the standard color mapping by associating the super-pixel values to standard color names; storing searchable vehicle information by: processing the plurality of vehicles using the standard color mapping to determine particular standard color names for the plurality of vehicles; and storing the particular standard color names for the plurality of vehicles as a part of the searchable vehicle information; generating a non-standard color name mapping by: determining whether a trigger condition is satisfied, the trigger condition being a label for one or more vehicles of the plurality of vehicles is present more than a threshold frequency or a threshold number of times; and in response to the trigger condition being satisfied, generating the non-standard color name mapping by associating the label with a particular super-pixel value and updating the searchable vehicle information for the one or more vehicles with a non-standard color name corresponding to the label; and hosting a vehicle search service using the searchable vehicle information to provide search results based on the particular standard color names for the plurality of vehicles and the non-standard color name.

A non-transitory computer-readable medium may store instructions that, when executed by a processor, cause the processor to perform a method for determining color labeling for a vehicle search service. The method may include: receiving a request; parsing the request to extract a search parameter; performing a search of searchable vehicle information by: determining whether the search parameter is a standard color type or a non-standard color type; in response to determining the search parameter is the standard color type, determining whether any vehicles of the searchable vehicle information have a matching standard color name to the search parameter and, if so, setting matching vehicles as a first group of vehicles; and in response to determining the search parameter is the non-standard color type, determining whether any vehicles of the searchable vehicle information have a matching non-standard color name to the search parameter and, if so, setting matching vehicles as a second group of vehicles; and transmitting a search result based on the first group of vehicles or the second group of vehicles.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to methods and systems for determining color labeling for a vehicle search service.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value. In the context of the current disclosure, the term "label" is used interchangeably with the term "name."

Vehicle related information may be collected from various vehicle information providers. For example, vehicle inventory information may be collected from more than a hundred different sources. Vehicle inventory information may include data relating to one or more vehicles that may be available for purchase. Vehicle exterior and interior color are fields in which customers may be particularly interested. Such customers may want to focus a search (e.g., on the internet) for a vehicle based on exterior and/or interior colors. While existing vehicle inventory information may include a specific field where the vehicle information provider may input vehicle exterior and/or interior color, the input data may include language that is not standardized (e.g., not agreed upon across the vehicle information providers) and/or includes misspellings. In some instances, an original equipment manufacturer (OEM) may assign a specific color a label that is not immediately recognizable to a customer. For example, an OEM may assign "shock" as the label for a light green yellowish color. A customer may not be able to understand or imagine a vehicle exterior color named "shock."

The techniques disclosed in the present disclosure address one or more of the above challenges. Some embodiments are directed to utilizing images depicting vehicles to predict one or more super-pixels associated with the exterior and/or interior color of each depicted vehicle. In some embodiments, the images may be provided by one or more vehicle information providers. In the context of the current disclosure, a super-pixel refers to a cluster of similar pixels in terms of color similarity and proximity to each other in a color-space. One or more color groups (e.g., standard colors (also referred to as generic colors)) may be predetermined, for example, black, white, green, yellow, red, blue, etc. Each of the predetermined color groups may be assigned specific RGB values representing the respective color group. In some embodiments, a non-standard color (e.g., provided by a vehicle information provider) may be linked with a predetermined color by determining color-space distance between a super-pixel for the non-standard color and a center pixel of each predetermined color. The predetermined color nearest distance to the super-pixel may be determined to be linked to the non-standard color.

As will be described in further detail below, there is provided herein methods and systems for determining color labeling for a vehicle search service. In some embodiments, a method may include receiving one or more images depicting vehicles. The images may depict an interior and/or an exterior of the vehicles. The image may be cropped to obtain the depicted vehicle. In some embodiments, the image may be cropped utilizing a centered crop, an object detection model, and/or an image segmentation model. A super-pixel segmentation technique may be applied to the cropped image, e.g., the image of the vehicle. In some embodiments, the super-pixel segmentation technique may include utilizing an appropriate clustering method to cluster similar pixels included in the cropped image based on color similarity and proximity to each other. An average color value may be determined for each super-pixel (e.g., a cluster of similar pixels). In the context of the current disclosure, a color value refers to a value such as an RGB (Red, Green, Blue) value, an HSL/HSV (Hue, Saturation, Value/Brightness) value, and/or CIELAB value that represents a particular color. In some embodiments, HSL/HSV value, and/or CIELAB value may be used instead of the RGB value as disclosed herein. In some embodiments, any combination of RGB value, HSL/HSV value, and/or CIELAB value may be used instead of the RGB value as disclosed herein. The super-pixels may then be clustered using an appropriate clustering method. An average color value for the largest cluster of super-pixels may be determined, thereby obtaining a representative color value for the vehicle. In some embodiments, the average color value for each of one or more of the largest clusters of super-pixels may be determined. In such embodiments, more than one representative color value may be determined for the vehicle. It is understood that any appropriate clustering method may be utilized, for example, K-means clustering, density-based spatial clustering of applications with noise (DBSCAN), and/or affinity propagation (AP), to cluster the pixels and super-pixels of the cropped image.

Once a representative color value for the vehicle has been determined, a standard color most relevant to the representative color value may be determined. In some embodiments, distances between the representative color value and the RBG value for the standard colors may be determined and compared using, for example, Euclidian distance, cosine similarity, and/or any appropriate distance metric. In such embodiments, the standard color that is nearest in distance may be determined to be associated with the representative color value.

Accordingly, a mapping for the representative color value (e.g., a non-standard color value), a color label for the representative color value provided by the vehicle information provider (e.g., OEM color name), the associated standard color, and a color name for the standard color (e.g., black, white, green, yellow, red, blue, etc.) may be obtained. In some embodiments, the mapping process described above may be performed for a plurality of images including the same non-standard color label (e.g., OEM color name). In such embodiments, the representative color determined for each of the plurality of images may be averaged to determine the corresponding standard color. That is, distances between an RGB value reflecting an average of the determined representative color values and the RGB values for the standard colors are determined and compared to determine the nearest distance standard color.

The embodiments disclosed herein provide significant advantages over conventional methods and systems. For example, the embodiments disclosed herein enhance software application capabilities including, but not limited to: programmatically understanding color descriptions that are not standardized; constructing a database that maps a vehicle information provider color label (e.g., OEM/dealer color label) to a standard color and associated information (e.g., RGB value and color label); naturally handling any standard misspellings or changes in vehicle information provider color labels (e.g., OEM color labels); determining color labels and associated colors (e.g., representative color and associated standard color) for vehicle images where the vehicle information provider has failed to provide a color label, e.g., by determining and/or retrieving a representative color for the same vehicle (e.g., same make and model) stored in the database that is nearest in distance in the color-space to a depicted vehicle and assigning the stored color label to the depicted vehicle; performing quality check on whether a vehicle information provider is providing consistent vehicle related information; and determining a better stock vehicle image if the vehicle information provider provides text but fails to provide related images.

Figure 1:
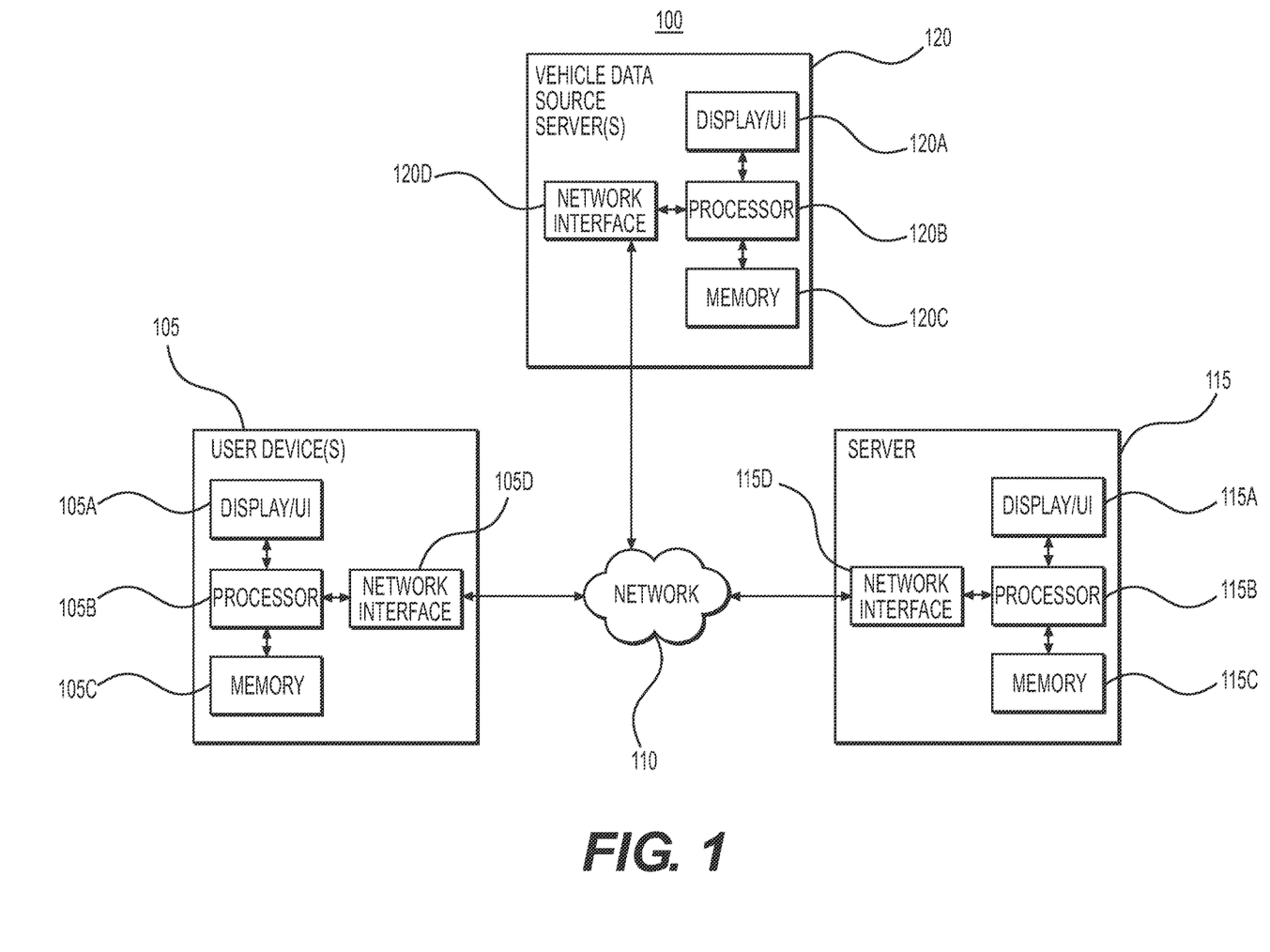
FIG. 1 depicts an exemplary block diagram of a system for determining color labeling for a vehicle search service, according to one or more embodiments.

Turning now to the figures, FIG. 1 depicts an exemplary block diagram of a system for determining color labeling for a vehicle search service, according to one or more embodiments. The system 100 may include one or more user device(s) 105, a network 110, a server 115, and a vehicle data source server 120. Hereafter, while the server 115 and/or the vehicle data source server 120 may interact with one or a plurality of the one or more user devices 105, this description will refer to the one or more user devices 105 as "the user device 105," so as to simplify the description of the concepts described herein. One of skill in the art would recognize that the server 115 and/or the vehicle data source server 120 may configure the one or more user devices 105 so as to experience different functionalities and/or have access to different information (e.g., determined by credentials such as user ID/password). Additionally, while the functionality carried out by the server 115 and/or the vehicle data source server 120 are discussed herein separately, in practice these features may be executed on more or fewer devices.

The user device 105, the server 115, and/or the vehicle data source server 120 may be connected via the network 110, using one or more standard communication protocols. The network 110 may be one or a combination of a wide area network (e.g., the Internet), a local network, or other network. The user device 105, the server 115, and/or the vehicle data source server 120 may transmit and receive messages from each other across the network 110. For example, the vehicle data source server 120 may provide vehicle related information to the server 115. As another example, the user device 105 may access a vehicle search service provided by the server 115.

The user device 105 may include a display/user interface (UI) 105A, a processor 105B, a memory 105C, and/or a network interface 105D. The user device 105 may be a computer, a cell phone, a tablet, etc. The user device 105 may execute, by the processor 105B, an operating system (O/S) and at least one application (each stored in memory 105C). The application may be a browser program or a mobile application program (which may also be a browser program in a mobile O/S). The application may generate one or more graphic user interfaces (GUIs) based on instructions/information stored in the memory 105C, instructions/information received from the server 115, and/or instructions/information received from the vehicle data source server 120. For instance, the GUIs might be application GUIs for the application executed based on XML and Android programming languages or Objective-C/Swift, but one skilled in the art would recognize that this may be accomplished by other methods, such as webpages executed based on HTML, CSS, and/or scripts, such as JavaScript. The display/UI 105A may be a touch screen or a display with other input systems (e.g., mouse, keyboard, etc.). The network interface 105D may be a TCP/IP network interface for, e.g., Ethernet or wireless communications with the network 110. The processor 105B, while executing the application, may receive user inputs from the display/UI 105A, and perform actions or functions in accordance with the application.

The server 115 may include a display/UI 115A, a processor 115B, a memory 115C, and/or a network interface 115D. The server 115 may be a computer, system of computers (e.g., rack server(s)), and/or or a cloud service computer system. The server 115 may execute, by the processor 115B, an operating system (O/S) and at least one instance of a server program (each stored in memory 115C). The server 115 may store or have access to server information (e.g., hosted on a third-party server such as vehicle data source server 120). The display/UI 115A may be a touch screen or a display with other input systems (e.g., mouse, keyboard, etc.) for an operator of the server 115 to control the functions of the server 115 (e.g., update the server program and/or the server information). The network interface 115D may be a TCP/IP network interface for, e.g., Ethernet or wireless communications with the network 110. The server program, executed by the processor 115B on the server 115, may be configured to perform a method for determining color labeling for a vehicle search service as will be described in further detail below.

The vehicle data source server 120 may include a display/ UI 120A, a processor 120B, a memory 120C, and/or a network interface 120D. In some embodiments, the vehicle data source server 120 may be a virtual computing platform. The vehicle data source server 120 may be a computer, system of computers (e.g., rack server(s)), and/or or a cloud service computer system. The vehicle data source server 120 may execute, by the processor 120B, an operating system (O/S) and at least one instance of a vehicle data source server program (each stored in memory 120C). The vehicle data source server 120 may store or have access to server information (e.g., hosted on a third-party server). The display/UI 120A may be a touch screen or a display with other input systems (e.g., mouse, keyboard, etc.) for an operator of the vehicle data source server 120 to control the functions of the vehicle data source server 120 (e.g., update the vehicle data source server program and/or the vehicle data source server information). The network interface 120D may be a TCP/IP network interface for, e.g., Ethernet or wireless communications with the network 110. The vehicle data source server program, executed by the processor 120B on the vehicle data source server 120, may be configured to provide vehicle related information to the server 115 and/or user device 105.

Figure 2:
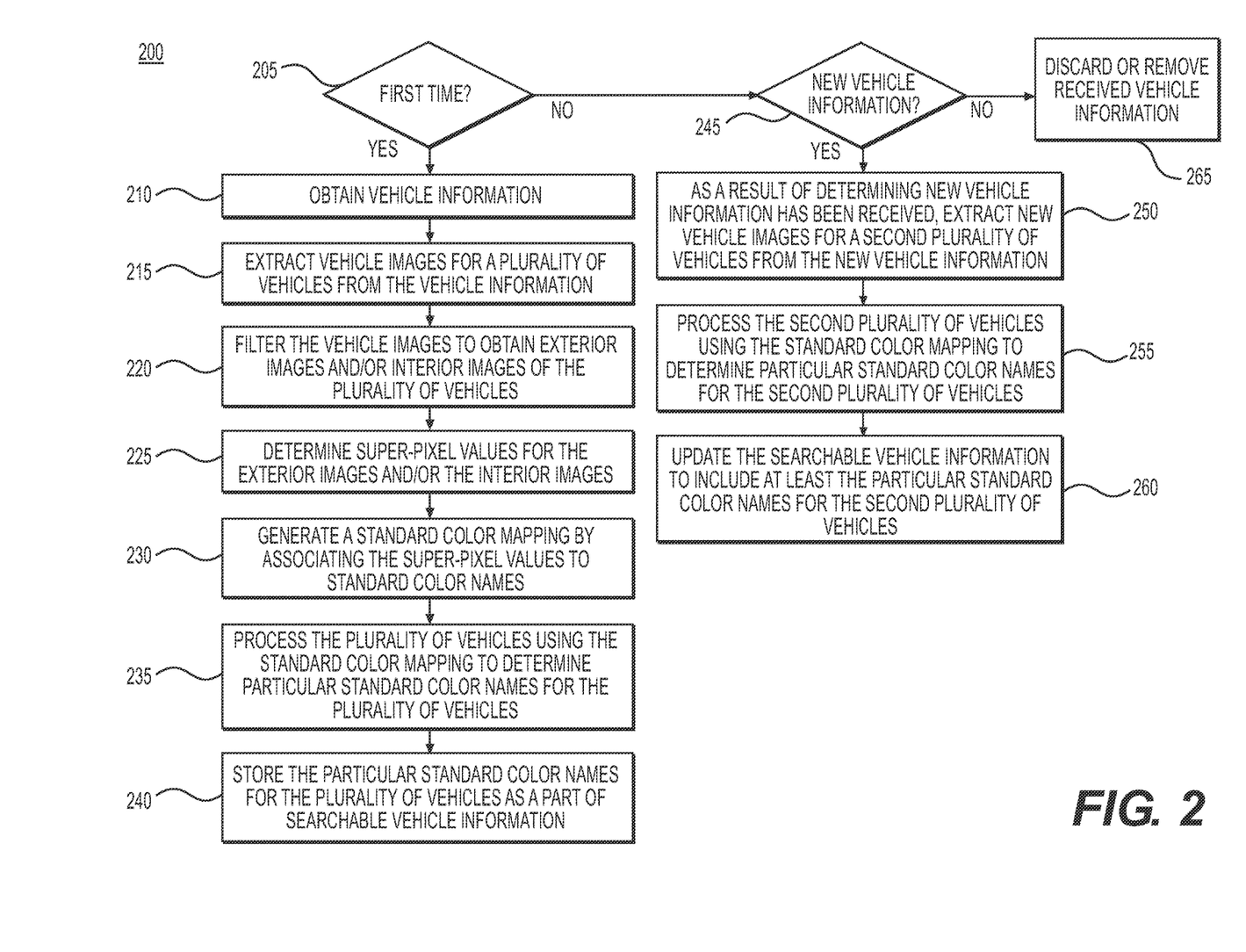
FIG. 2 depicts a flowchart of a method for determining color labeling for a vehicle search service, according to one or more embodiments.

FIG. 2 depicts a flowchart of a method 200 for determining color labeling for a vehicle search service, according to one or more embodiments. As shown in FIG. 2, method 200 may begin with step 205 in which the server 115 may determine whether a vehicle information provider (e.g., a vehicle dealership) has provided vehicle information (e.g., via vehicle data source server 120) for the first time. In some embodiments, the server 115 may determine whether the vehicle information provider has provided vehicle information for the first time by comparing the vehicle information provider with a stored (e.g., in memory 115C) list of vehicle information providers. In some embodiments, the list of vehicle information providers may include a list of vehicle information providers that have previously provided vehicle information (e.g., to the server 115). In such embodiments, the server 115 may determine that a specific vehicle information provider is not providing vehicle information for the first time if there is a match in the list of vehicle information providers. Similarly, the server 115 may determine that a specific vehicle information provider is providing vehicle for the first time if a match does not exist in the list of vehicle information providers.

Based on a determination that the vehicle information provider is providing vehicle information for the first time, method 200 moves on to step 210 in which the server 115 may obtain the vehicle information. In step 215, vehicle images for a plurality of vehicles may be extracted from the obtained vehicle information. In some embodiments, vehicle images included in the vehicle information may be identified based on a file format. For example, a vehicle image may be a digital file in any one of the following file formats: JPG, TIFF, BMP, PNG, RAW, or PDF. In such embodiments, the vehicle images may be extracted based on the file format.

In step 220, the server 115 may filter the vehicle images to obtain exterior images and/or interior images of the plurality of vehicles. In some embodiments, step 220 may include cropping the exterior images and/or the interior images of the plurality of vehicles. In some embodiments, cropping the exterior images and/or the interior images may include center cropping the exterior images and/or the interior images. In some embodiments, cropping the exterior images and/or the interior images may include generating bounding boxes around vehicle features of the exterior images and/or the interior images using an object detection model and cropping the bounding boxes. In some embodiments, cropping the exterior images and/or the interior images may include generating cut outs of the vehicle features of the exterior images and/or the interior images using an image segmentation model and cropping the cut outs.

In step 225, the server 115 may determine super-pixel values for the exterior images and/or the interior images. In some embodiments, the super-pixel values may be determined for the cropped exterior images and/or the cropped interior images. In some embodiments, step 225 may include clustering pixels of an image into super-pixel groups based on color similarity and proximity of the pixels and determining average colors for the super-pixel groups. Step 225 may further include clustering the super-pixel groups into cluster(s) based on the average colors and determining a super-pixel value for the image by averaging RGB color values of a largest cluster of the cluster(s). In some embodiments, step 225 may further include programmatically removing pixels of windshields, windows, and/or glass from the image.

In step 230, the server 115 may generate a standard color mapping by associating the super-pixel values to standard color names. In some embodiments, step 230 may include obtaining color values for the standard color names for each super-pixel value of the super-pixel values. In such embodiments, step 230 may further include determining a nearest color value of the standard color names to the super-pixel value and associating a standard color name corresponding to the nearest color value of the standard color names with the super-pixel value. In some embodiments, determining the nearest color value of the standard color names to the super-pixel value may include determining distances to each of the color values for the standard color names to the super-pixel value using a Euclidian distance algorithm and selecting a shortest distance as the nearest color value. In some embodiments, determining the nearest color value of the standard color names to the super-pixel value may include determining similarity scores for each of the color values for the standard color names to the super-pixel value using a cosine similarity algorithm and selecting a highest similarity score as the nearest color value. In some embodiments, step 230 may include obtaining, from the vehicle information, a color label (e.g., the vehicle information provider color label may be a standard color name or a non-standard color name such as an OEM color name) of an image corresponding to the super-pixel value. In some embodiments, step 230 may further include mapping the obtained color label, the super-pixel value, the standard color name corresponding to the nearest color value of the standard color names, and/or the nearest color value. In the context of the current disclosure, it is understood that a standard color name may be any predefined color name associated with a distinct color value. For example, standard color names may include "blue," "light blue," "dark blue," etc., each with a distinct color value. In some embodiments, step 230 may further include mapping the obtained color label, the super-pixel value, more than two standard color names corresponding to the nearest color values of the standard color names, and/or the nearest color values. In some embodiments, the mapping may further include one or more vehicle information provider color labels (e.g., OEM color labels) that have already been mapped, i.e., one or more vehicle information provider color labels each with previously determined super-pixel values. In such embodiments, one or more vehicle information provider color labels with previously determined super-pixel values that are closest to the super-pixel value may be determined. Accordingly, the determined one or more vehicle information provider color labels may be mapped with the obtained color label, the super-pixel value, more than two standard color names corresponding to the nearest color values of the standard color names, and/or the nearest color values.

In step 235, the server 115 may process the plurality of vehicles using the standard color mapping to determine particular standard color names for the plurality of vehicles. In some embodiments, one or more particular standard color names may be determined for each of the plurality of vehicles depicted in the vehicle images by obtaining the one or more super-pixel values for a vehicle and assigning the standard color name associated with each of the obtained one or more super-pixel values as the one or more particular standard color names for the vehicle. In step 240, the server 115 may store (e.g., in memory 115C) the particular standard color names for the plurality of vehicles as a part of searchable vehicle information.

Referring back to step 205, based on a determination that the vehicle information provider is not providing vehicle information for the first time, method 200 moves on to step 245. In step 245, the server 115 may determine whether the vehicle information provider is providing new vehicle information. In some embodiments, the server 115 may receive vehicle information from the vehicle information provider and compare the received vehicle information with previously stored vehicle information (e.g., in memory 115C). In such embodiments, the server 115 may determine whether the received vehicle information or portions of the received vehicle information are new compared to the previously stored the vehicle information. Based on a determination that the vehicle information provider is not providing new vehicle information, the received vehicle information may be discarded and/or removed as shown in step 265.

Based on a determination that the vehicle information provider is providing new vehicle information, the method 200 moves on to step 250 in which the server 115 may extract new vehicle images for a second plurality of vehicles from the new vehicle information. In some embodiments, new vehicle images included in the new vehicle information may be identified based on a file format. For example, a vehicle image may be a digital file in any one of the following file formats: JPG, TIFF, BMP, PNG, RAW, or PDF. In such embodiments, the new vehicle images may be extracted based on the file format.

In step 255, the server 115 may process the second plurality of vehicles using the standard color mapping to determine particular standard color names for the second plurality of vehicles. In some embodiments, the second plurality of vehicles may be processed in accordance to any combination of steps 220 through 235 as described above. In step 260, the server 115 may update the searchable vehicle information to include at least the particular standard color names for the second plurality of vehicles.

Figure 3:
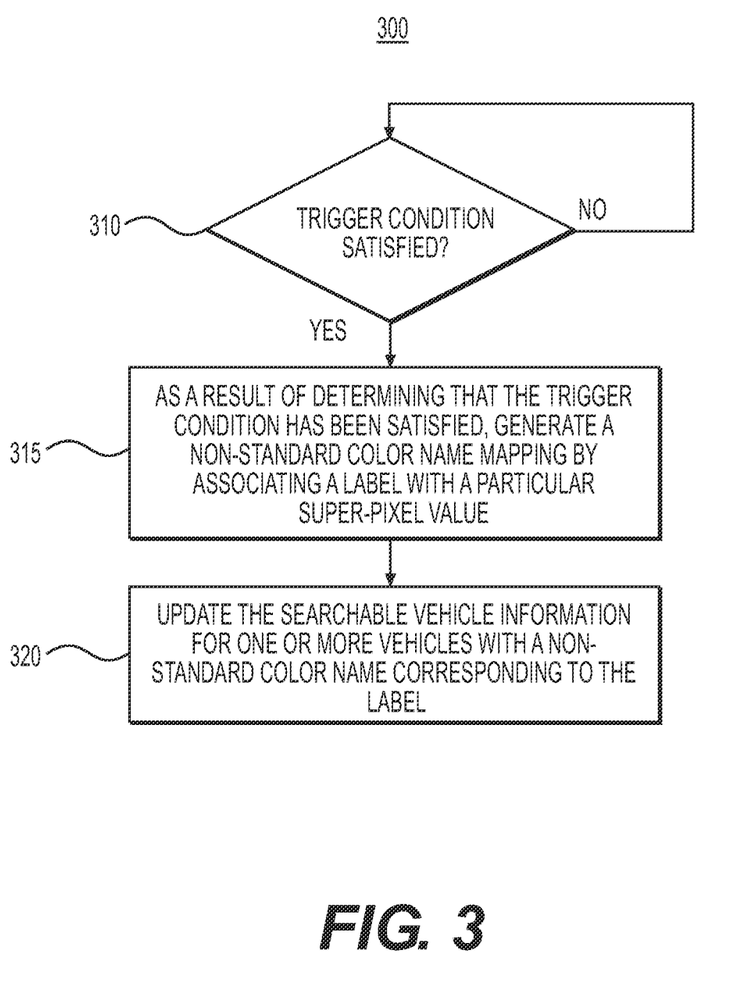
FIG. 3 depicts a flowchart of a method for determining color labeling for a vehicle search service, according to one or more embodiments.

FIG. 3 depicts a flowchart of a method 300 for determining color labeling for a vehicle search service, according to one or more embodiments. As shown in FIG. 3, method 300 may begin with step 310 in which the server 115 may determine whether a trigger condition has been satisfied while generating the standard color mapping as described above with reference to step 230 of FIG. 2. In some embodiments, the server 115 may determine that a specific non-standard color name (e.g., a color label provided by a vehicle information provider such as an OEM color name) has been mapped with a standard color for a certain number of times. In such embodiments, the trigger condition may be a predetermined number of times that a specific non-standard color name is mapped during step 230. For example, the server 115 may determine that the certain number of times that the specific non-standard color name has been mapped exceeds a predetermined threshold (e.g., a predetermined number of times). In such instances, the server 115 may determine that the trigger condition has been satisfied. In other words, the trigger condition may be when a label (e.g., a non-standard color name) for one or more vehicles of the plurality of vehicles is present more than a threshold frequency and/or a threshold number of times. If the server 115 determines that the trigger condition has not been satisfied, the server 115 continues to monitor the frequency at which certain non-standard color names (e.g., color labels provided by a vehicle information provider such as OEM color names) are considered while generating the standard color mapping as described above with reference to step 230 of FIG. 2.

Based on a determination that the trigger condition has been satisfied, method 300 moves on to step 315 in which the server 115 may generate a non-standard color name mapping by associating the label with a particular super-pixel value. For example, the label may be associated with a particular super-pixel value determined based on the one or more vehicles. In some embodiments, step 310 of method 300 may be optional. In such embodiments, method 300 may begin with step 315 by generating a non-standard color name mapping by associating a color label provided by a vehicle information provider such as an OEM color name with a particular super-pixel value. In step 320, the server 115 may update the searchable vehicle information for the one or more vehicles with a non-standard color name corresponding to the label.

Figure 4:
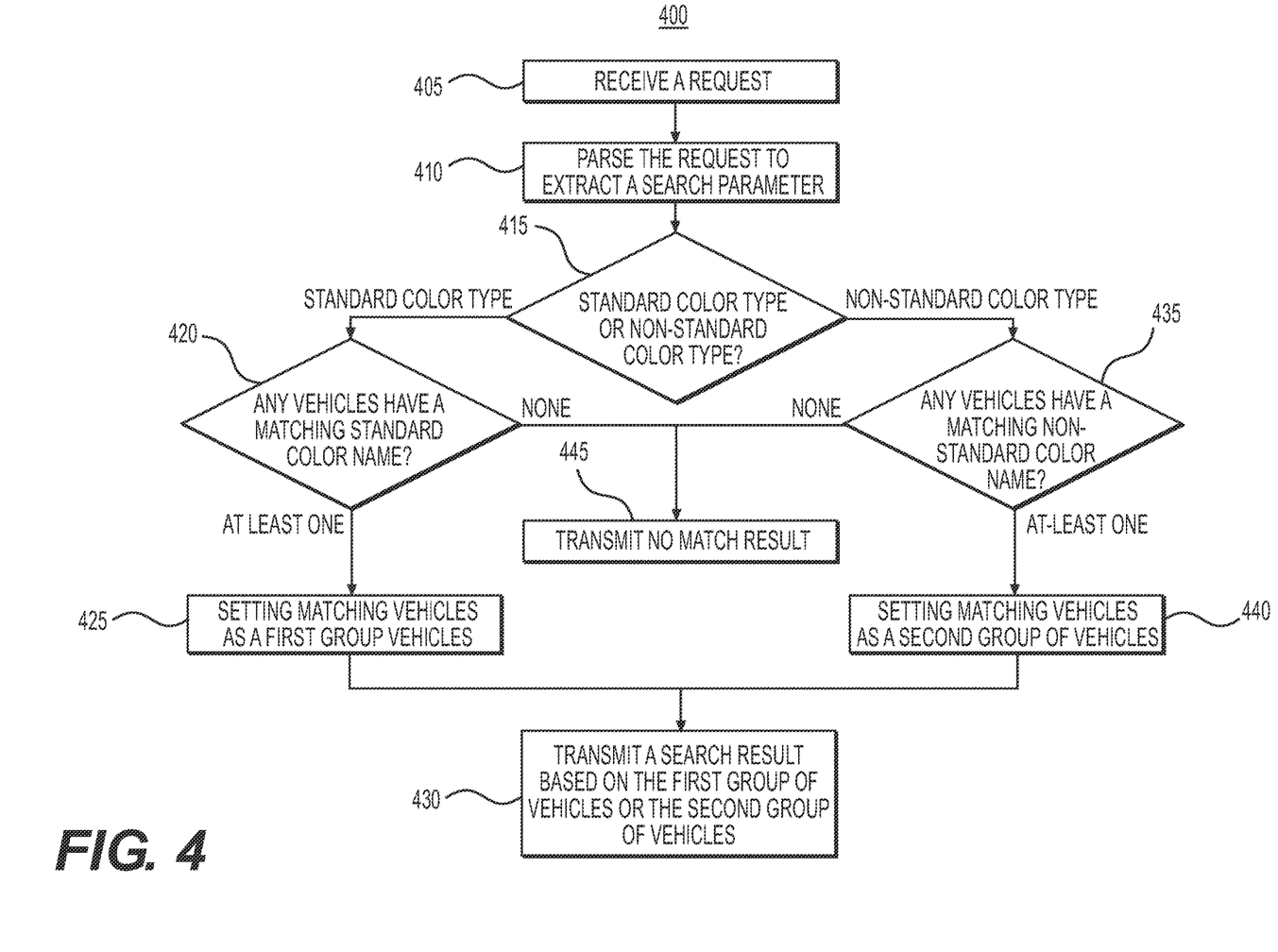
FIG. 4 depicts a flowchart of a method of for hosting a vehicle search service to provide search results based on particular standard color names for vehicles and/or a non-standard color name, according to one or more embodiments.

FIG. 4 depicts a flowchart of a method 400 for hosting a vehicle search service to provide search results based on particular standard color names for vehicles and a non-standard color name using the searchable vehicle information disclosed herein.

Figure 5A:
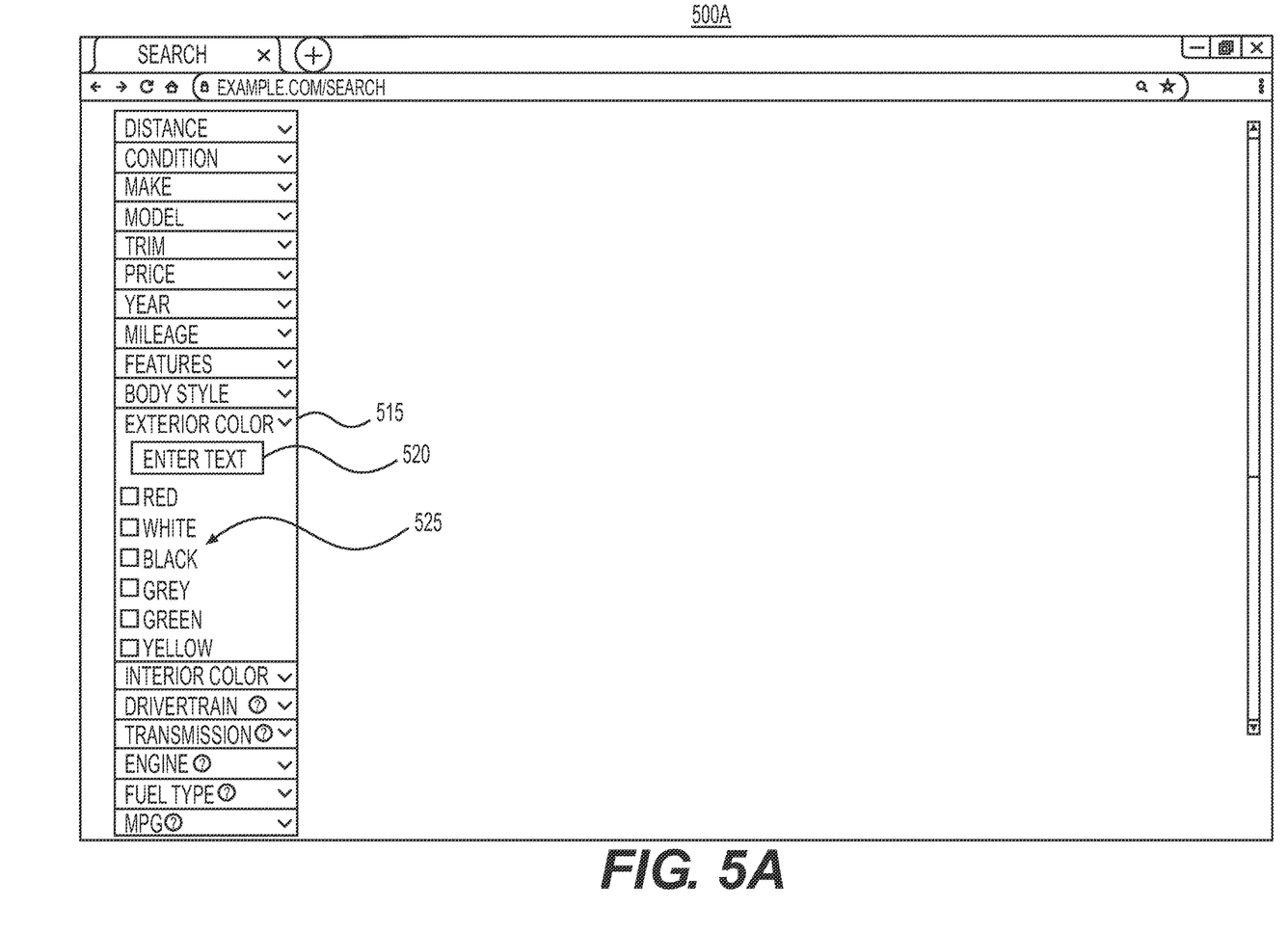
FIGS. 5A and 5B depict GUIs for determining color labeling for a vehicle search service, according to one or more embodiments.

As shown in FIG. 4, method 400 may begin with step 405 in which a request may be received by the server 115. In some embodiments, the request may be made by a customer for a specific color of a vehicle provided by the vehicle search service. For example, the customer may access a GUI 500A associated with the vehicle search service and enter a search term for a desired vehicle color in designated area 520 (also referred to as search bar) within designated area 515 (also referred to as a panel including information associated with an exterior color of a desired vehicle), as shown in FIG. 5A. In some embodiments, the customer may interact with designated area 515 (e.g., by clicking and/or touching the designated area 515) to cause the GUI 500A to display a drop down menu including search bar (designated area 520) and predetermined colors 525 associated with a desired vehicle color. In some embodiments, the customer may click on one or more predetermined colors 525 for the desired vehicle color. In some embodiments, the GUI 500A may additionally, or alternatively to the drop down menu, display a color palette to the user. In such embodiments, the user may select a desired color from the displayed color palette.

Referring back to FIG. 4, the server 115 may parse the received request to extract one or more search parameters in step 410. In step 415, the server 115 may determine whether the extracted search parameters are associated with a standard color type and/or a non-standard color type. In instances in which the user has selected a desired color from a displayed color palette, the server may determine whether the color value of the selected desired color is associated with a standard color type and/or a non-standard color type.

Based on a determination that a search parameter is associated with a standard color type, the method 400 moves on to step 420 in which the server 115 may determine whether any vehicles included in the searchable vehicle information have a matching standard color name to the search parameter. For example, the server 115 may determine whether any vehicles included in the searchable vehicle information have been mapped to a standard color name matching the search parameter. As a result of determining that there are no vehicles included in the searchable vehicle information that have a matching standard color name to the search parameter, the server 115 may transmit a no match result in step 445. Based on a determination that there is at least one vehicle that has a matching standard color name to the search parameter, the server 115 may set the matching at least one vehicle as a first group of vehicles in step 425.

Referring back to step 415, if the server 115 determines that a search parameter is associated with a non-standard color type, the method 400 moves on to step 435 in which the server 115 determines whether any vehicles included in the searchable vehicle information have a matching non-standard color name to the search parameter. For example, the server 115 may determine whether any vehicles included in the searchable vehicle information have been mapped to a non-standard color name matching the search parameter. As a result of determining that there are no vehicles included in the searchable vehicle information that have a matching non-standard color name to the search parameter, the server 115 may transmit a no match result in step 445. Based on a determination that there is at least one vehicle that has a matching non-standard color type to the search parameter, the server 115 may set the matching at least one vehicle as a second group of vehicles in step 440.

Figure 5B:
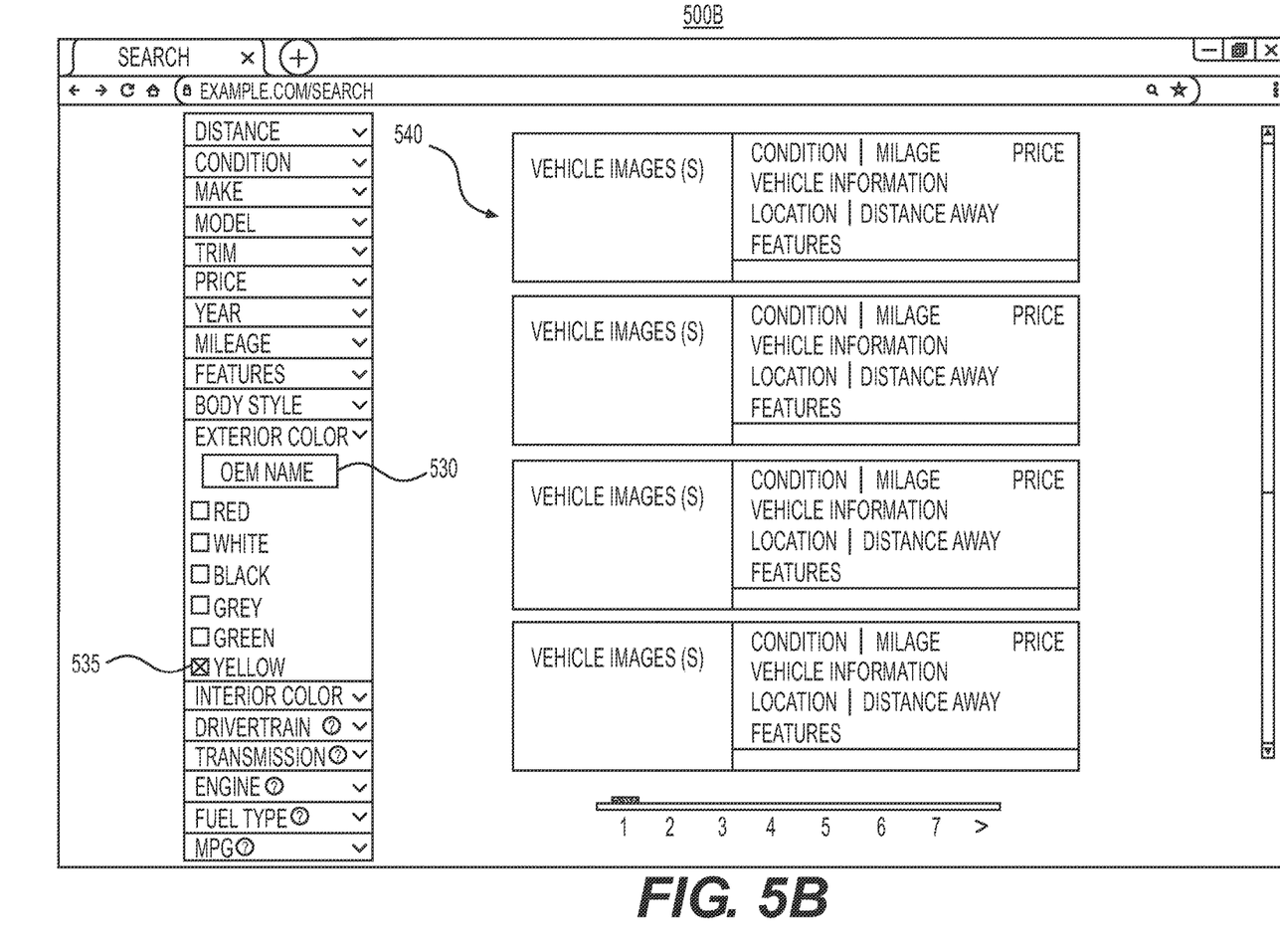

In step 430, the server 115 may transmit a search result based on the first group of vehicles and/or the second group of vehicles. For example, the search result may be transmitted via GUI 500B as shown in FIG. 5B. As shown in FIG. 5B, a customer may have submitted a request for a desired vehicle color by entering a search term (e.g., OEM name 530) and/or clicking a predetermined standard color 535 (e.g., yellow). Accordingly, server 115 may parse the received request to determine one or more search parameters as described above with reference to step 410. In the example depicted in FIG. 5B, there may be a search parameter associated with a non-standard color type (e.g., OEM name 530) and a search parameter associated with a standard color type (e.g., yellow 535). Accordingly, the search results 540 may include one or more groups of vehicles associated with the search parameters as described above with reference to FIG. 4 in steps 415-445.

Figure 6:
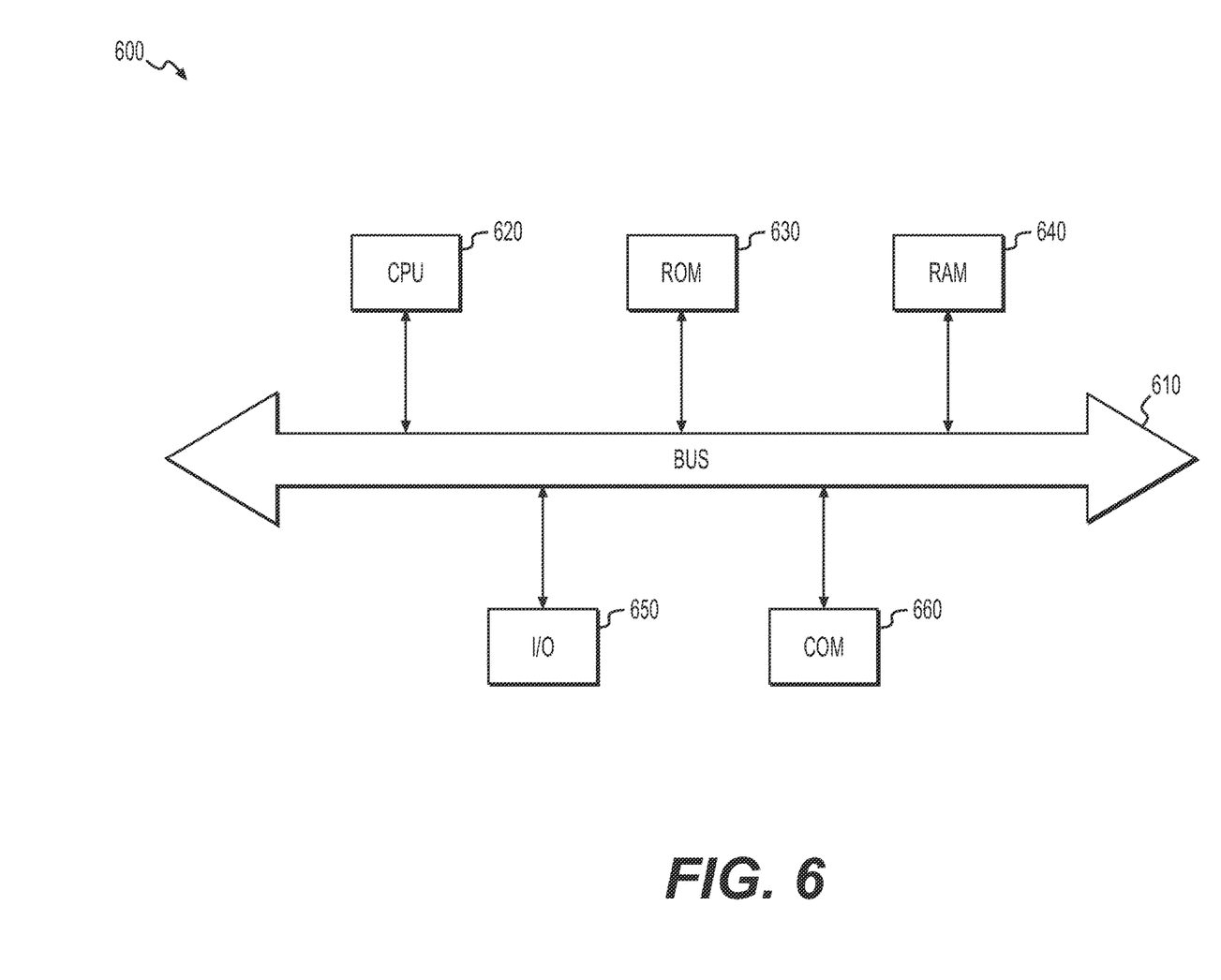
FIG. 6 depicts an example system that may execute techniques presented herein.

FIG. 6 depicts an example system 600 that may execute techniques presented herein. FIG. 6 is a simplified functional block diagram of a computer (e.g., system) that may be configured to execute techniques described herein, according to exemplary embodiments of the present disclosure. Specifically, the computer (or "platform" as it may not be a single physical computer infrastructure) may include a data communication interface 660 for packet data communication. The platform may also include a central processing unit ("CPU") 620, in the form of one or more processors, for executing program instructions. The platform may include an internal communication bus 610, and the platform may also include a program storage and/or a data storage for various data files to be processed and/or communicated by the platform such as ROM 630 and RAM 640, although the system 600 may receive programming and data via network communications. The system 600 also may include input and output ports 650 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for determining color labeling for a vehicle search service, the computer-implemented method comprising:
    generating a standard color mapping for vehicles by:
        obtaining vehicle information;
        extracting vehicle images for a plurality of vehicles from the vehicle information;
        filtering the vehicle images to obtain exterior images and/or interior images of the plurality of vehicles;
        determining super-pixel values for the exterior images and/or the interior images; and
        generating the standard color mapping by associating the super-pixel values to standard color names; and
    storing searchable vehicle information by:
        processing the plurality of vehicles using the standard color mapping to determine particular standard color names for the plurality of vehicles; and
        associating the particular standard color names with the respective plurality of vehicles as a part of the searchable vehicle information, the searchable vehicle information enabling generation of search results based on the particular standard color names for the plurality of vehicles.

2. The computer-implemented method of claim 1, wherein the computer-implemented method further includes:
    generating a non-standard color name mapping by:
        determining whether a trigger condition is satisfied, the trigger condition being a label for one or more vehicles of the plurality of vehicles is present more than a threshold frequency or a threshold number of times; and
        in response to the trigger condition being satisfied, generating the non-standard color name mapping by associating the label with a particular super-pixel value and updating the searchable vehicle information for the one or more vehicles with a non-standard color name corresponding to the label.

3. The computer-implemented method of claim 2, further comprising:
    hosting a vehicle search service using the searchable vehicle information by:
        receiving a request;
        parsing the request to extract a search parameter;
        determining whether the search parameter is a standard color type or a non-standard color type;
        in response to determining the search parameter is the standard color type, determining whether any vehicles of the searchable vehicle information have a matching standard color name to the search parameter and, if so, setting matching vehicles as a first group of vehicles;
        in response to determining the search parameter is the non-standard color type, determining whether any vehicles of the searchable vehicle information have a matching non-standard color name to the search parameter and, if so, setting matching vehicles as a second group of vehicles; and
        transmitting a search result based on the first group of vehicles or the second group of vehicles.

4. The computer-implemented method of claim 1, wherein the determining the super-pixel values for the exterior images and/or the interior images includes:
    cropping the exterior images and/or the interior images; and
    determining the super-pixel values for the cropped exterior images and/or the cropped interior images.

5. The computer-implemented method of claim 4, wherein the cropping the exterior images and/or the interior images includes one or combinations of:
    center cropping the exterior images and/or the interior images;
    generating bounding boxes around vehicle features of the exterior images and/or the interior images using an object detection model and cropping the bounding boxes;
    and/or generating cut outs of the vehicle features of the exterior images and/or the interior images using an image segmentation model and cropping the cut outs.

6. The computer-implemented method of claim 1, wherein the determining the super-pixel values for the exterior images and/or the interior images includes, for each image of the exterior images and/or the interior images:
    clustering pixels of the image into super-pixel groups based on color similarity and proximity of the pixels;
    determining average colors for the super-pixel groups;
    clustering the super-pixel groups into cluster(s) based on the average colors; and
    determining a super-pixel value for the image by averaging RGB color values of a largest cluster of the cluster(s).

7. The computer-implemented method of claim 6, wherein the determining the super-pixel values for the exterior images and/or the interior images further includes, before the clustering the pixels of the image:
    programmatically removing pixels of windshields, windows, and/or glass from the image.

8. The computer-implemented method of claim 1, wherein the generating the standard color mapping by associating the super-pixel values to the standard color names includes, for each super-pixel value of the super-pixel values:
    obtaining color values for the standard color names;
    determining a nearest color value of the standard color names to the super-pixel value; and
    associating a standard color name corresponding to the nearest color value of the standard color names with the super-pixel value.

9. The computer-implemented method of claim 8, wherein the determining the nearest color value of the standard color names to the super-pixel value includes one of:
    determining distances to each of the color values for the standard color names to the super-pixel value using a Euclidian distance algorithm and selecting a shortest distance as the nearest color value; or determining similarity scores for each of the color values for the standard color names to the super-pixel value using a cosine similarity algorithm and selecting a highest similarity score as the nearest color value.

10. The computer-implemented method of claim 8, wherein the generating the standard color mapping by associating the super-pixel values to the standard color names further includes:

obtaining, from the vehicle information, a color label of an image corresponding to the super-pixel value; and mapping the color label, the super-pixel value, the standard color name corresponding to the nearest color value of the standard color names, and the nearest color value.

11. A system for determining color labeling for a vehicle search service, the system comprising:

a memory storing instructions; and a processor executing the instructions to perform a process including:

generating a standard color mapping for vehicles by:
obtaining vehicle information;
extracting vehicle images for a plurality of vehicles from the vehicle information;
filtering the vehicle images to obtain exterior images and/or interior images of the plurality of vehicles;
determining super-pixel values for the exterior images and/or the interior images; and
generating the standard color mapping by associating the super-pixel values to standard color names;

storing searchable vehicle information by:
processing the plurality of vehicles using the standard color mapping to determine particular standard color names for the plurality of vehicles; and
storing the particular standard color names for the plurality of vehicles as a part of the searchable vehicle information;

generating a non-standard color name mapping by:
determining whether a trigger condition is satisfied, the trigger condition being a label for one or more vehicles of the plurality of vehicles is present more than a threshold frequency or a threshold number of times; and
in response to the trigger condition being satisfied, generating the non-standard color name mapping by associating the label with a particular super-pixel value and updating the searchable vehicle information for the one or more vehicles with a non-standard color name corresponding to the label; and hosting a vehicle search service using the searchable vehicle information to provide search results based on the particular standard color names for the plurality of vehicles and the non-standard color name.

12. The system of claim 11, wherein, to host the vehicle search service, the process further includes:

receiving a request;

parsing the request to extract a search parameter;

performing a search of the searchable vehicle information by:
determining whether the search parameter is a standard color type or a non-standard color type;
in response to determining the search parameter is the standard color type, determining whether any vehicles of the searchable vehicle information have a matching standard color name to the search parameter and, if so, setting matching vehicles as a first group of vehicles; and
in response to determining the search parameter is the non-standard color type, determining whether any vehicles of the searchable vehicle information have a matching non-standard color name to the search parameter and, if so, setting matching vehicles as a second group of vehicles; and transmitting a search result based on the first group of vehicles or the second group of vehicles.

13. The system of claim 11, wherein, to determine the super-pixel values for the exterior images and/or the interior images, the process further includes:

cropping the exterior images and/or the interior images; and determining the super-pixel values for the cropped exterior images and/or the cropped interior images.

14. The system of claim 13, wherein, to crop the exterior images and/or the interior images, the process further includes one or combinations of:

center cropping the exterior images and/or the interior images;

generating bounding boxes around vehicle features of the exterior images and/or the interior images using an object detection model and cropping the bounding boxes; and/or generating cut outs of the vehicle features of the exterior images and/or the interior images using an image segmentation model and cropping the cut outs.

15. The system of claim 11, wherein, to determine the super-pixel values for the exterior images and/or the interior images, the process further includes, for each image of the exterior images and/or the interior images:

clustering pixels of the image into super-pixel groups based on color similarity and proximity of the pixels;

determining average colors for the super-pixel groups;

clustering the super-pixel groups into cluster(s) based on the average colors; and determining a super-pixel value for the image by averaging RGB color values of a largest cluster of the cluster (s).

16. The system of claim 15, wherein, to determine the super-pixel values for the exterior images and/or the interior images, the process further includes, before the clustering the pixels of the image:

programmatically removing pixels of windshields, windows, and/or glass from the image.

17. The system of claim 11, wherein, to generate the standard color mapping by associating the super-pixel values to the standard color names includes, the process further includes, for each super-pixel value of the super-pixel values:

obtaining color values for the standard color names;

determining a nearest color value of the standard color names to the super-pixel value; and associating a standard color name corresponding to the nearest color value of the standard color names with the super-pixel value.

18. The system of claim 17, wherein, to determine the nearest color value of the standard color names to the super-pixel value, the process further includes one of:

determining distances to each of the color values for the standard color names to the super-pixel value using a Euclidian distance algorithm and selecting a shortest distance as the nearest color value; or determining similarity scores for each of the color values for the standard color names to the super-pixel value using a cosine similarity algorithm and selecting a highest similarity score as the nearest color value.

19. The system of claim 17, wherein, to generate the standard color mapping by associating the super-pixel values to the standard color names, the process further includes:
obtaining, from the vehicle information, a color label of an image corresponding to the super-pixel value; and
mapping the color label, the super-pixel value, the standard color name corresponding to the nearest color value of the standard color names, and the nearest color value.

20. A non-transitory computer-readable medium storing instructions that, when executed by a processor, cause the processor to perform a method for determining color labeling for a vehicle search service, the method comprising:
generating a standard color mapping for vehicles by:
obtaining vehicle information;
extracting vehicle images for a plurality of vehicles from the vehicle information;
filtering the vehicle images to obtain exterior images and/or interior images of the plurality of vehicles;
determining super-pixel values for the exterior images and/or the interior images; and
generating the standard color mapping by associating the super-pixel values to standard color names; and
storing searchable vehicle information by:
processing the plurality of vehicles using the standard color mapping to determine particular standard color names for the plurality of vehicles; and
associating the particular standard color names with the respective plurality of vehicles as a part of the searchable vehicle information, the searchable vehicle information enabling generation of search results based on the particular standard color names for the plurality of vehicles.

* * * * *